United States Patent [19]
Gerhardinger

[11] Patent Number: 6,024,084
[45] Date of Patent: Feb. 15, 2000

[54] DOUBLE SIDED HEAT BARRIER GLASS WITH CLEAR CVD COATING AND METHOD OF MAKING THE SAME

[75] Inventor: Peter F. Gerhardinger, Hendersonville, Tenn.

[73] Assignee: Engineered Glass Products, LLC, Chicago, Ill.

[21] Appl. No.: 09/255,561

[22] Filed: Feb. 22, 1999

[51] Int. Cl.[7] .................................................. F23M 7/00
[52] U.S. Cl. ............................................................. 126/200
[58] Field of Search ............................................. 126/200

[56] References Cited

U.S. PATENT DOCUMENTS

| | | |
|---|---|---|
| 3,192,575 | 7/1965 | Rosenau, Jr. et al. . |
| 3,991,738 | 11/1976 | Krebs . |
| 4,041,930 | 8/1977 | Katona . |
| 4,048,978 | 9/1977 | Plumat et al. ............................ 126/200 |
| 4,187,336 | 2/1980 | Gordon . |
| 4,206,252 | 6/1980 | Gordon . |
| 4,382,177 | 5/1983 | Heaney ................................... 126/200 |
| 4,419,386 | 12/1983 | Gordon . |
| 4,450,201 | 5/1984 | Brill et al. . |
| 4,455,479 | 6/1984 | Itoh et al. ................................ 126/200 |
| 4,898,147 | 2/1990 | Doni et al. .............................. 126/200 |
| 4,951,652 | 8/1990 | Ferrario et al. . |
| 4,985,312 | 1/1991 | Furuya et al. . |
| 5,337,727 | 8/1994 | Borens et al. .......................... 126/200 |
| 5,441,036 | 8/1995 | Mikalauskas, II et al. . |
| 5,798,142 | 8/1998 | Soubeyrand . |

*Primary Examiner*—Carroll Dority
*Attorney, Agent, or Firm*—Marshall & Melhorn

[57] ABSTRACT

A coated glass article is comprised of a transparent infrared reflective coating disposed on each major surface of a glass substrate. The glass article has a particular application as part of the window assembly for an oven door of a self cleaning oven. The window assembly includes a first glass substrate and a second glass substrate and a frame which supports the first and second glass substrates in a spaced apart and mutually parallel relationship. An infrared reflective coating is disposed preferably on both major surfaces of the first and second glass substrates. The invention also includes the method of making the coated glass article.

20 Claims, 2 Drawing Sheets

DOUBLE SIDED HEAT BARRIER GLASS WITH CLEAR CVD COATING AND METHOD OF MAKING THE SAME

BACKGROUND OF THE INVENTION

The present invention relates to a glass substrate having two major surfaces and an infrared reflective coating disposed on each major surface. More particularly, the coated glass article has excellent heat resistant qualities and can be used as a heat barrier glass. This coated glass article has a particular application as at least one of the glass substrates in a view window of an oven, especially a self cleaning oven.

In the case of an oven door, one important quality is its ability to act as a heat barrier or heat sink. Ideally, a plurality of glass substrates inside the oven door should absorb the heat generated in the interior of the oven during use and transmit as little as possible of that heat to the exterior surface of the oven door. This is particularly important in the case of a self cleaning oven. Typically, the cook chamber of a self cleaning oven may reach temperatures as high as 482° C. (900° F.) during the self cleaning process. According to the Underwriters Laboratories Standards, the temperature of an outer surface of the outer most exterior glass of the window for a self cleaning oven may not exceed 77° C. (170° F.). Usually, oven manufacturers prefer to limit this exterior temperature of the outer surface of the outer most exterior glass to 60° C. (140° F.) or below.

Prior attempts to create a heat barrier glass include a plurality of glass substrates in a spaced apart relationship. In the case of a self cleaning oven, this is disclosed for example in U.S. Pat. No. 5,441,036. In accordance with this patent, four glass panes in a parallel and spaced apart relationship are provided. Channels are provided between the panes of glass. A fan is provided to force airflow through the channels. The forced air travels through the channels and absorbs some of the heat that would otherwise be transmitted to the panes of glass, and prevents it from radiating toward the exterior glass pane or exterior surface of the oven door. This patent also teaches the use of heat radiating fins in combination with the forced air flow.

In U.S. Pat. No. 4,951,652, a "getter" material is disclosed to reduce heat transmission. A double pane window assembly includes an evacuated space between the walls of the two panes of the window. The evacuated space is filled with a non-evaporable "getter" material. The "getter" material absorbs warm gases that are emitted from the internal pane of the window. However, this patent does not disclose utilizing such a system at temperatures typically encountered during self cleaning. Other known techniques include the use of a forced flow of a cooling fluid between adjacent panes of the view window, as in U.S. Pat. No. 3,192,575.

These previous attempts have not demonstrated satisfactory thermal performance regarding the necessary temperature drop across the view window during the self cleaning process. Also, many of the glass substrates that make up the discussed view window assemblies have an objectionable color. Furthermore, some of these same substrates include tong marks or other processing imperfections. Additionally, these prior attempts are relatively complex, expensive, and prone to breakdown.

The invention provides a view window that will act as a heat barrier to achieve a sufficient temperature drop across the view window and will exhibit superior thermal performance. It is also an object of the invention to provide a view window for the door of a self cleaning oven which exhibits a neutral color in reflectance. Furthermore, the invention will result in a view window which does not include tong marks or other processing imperfections associated with the discussed art. The invention also results in a simpler construction and less expensive view window. Lastly, the invention has exhibited excellent reliability.

SUMMARY OF THE INVENTION

The coated glass article of the invention includes a glass substrate having first and second major surfaces. The major surfaces are in an opposed relationship to each other. A transparent infrared reflective coating is disposed on both of the major surfaces of the glass substrate.

This invention has a particularly advantageous application as part of the view window for an oven door of a self cleaning oven. The view window includes a first glass substrate having first and second major surfaces in an opposed relationship and a second glass substrate having first and second major surfaces in an opposed relationship. Further, a frame supports the first and second glass substrates in a spaced apart and mutually parallel relationship. The frame is attached to the oven door in a predetermined location. An infrared reflective coating is disposed on at least one and preferably both major surfaces of the first and second glass substrates.

The invention also includes a preferred method of making the above described glass substrate. A glass substrate having first and second major surfaces is provided. The first major surface of the substrate, as provided, is coated with a transparent infrared reflective coating. The second major surface of the glass substrate has not yet been coated with an infrared reflective coating.

A coating apparatus for a tempering oven which includes multiple coaters is provided for coating the second major surface of the glass substrate. The glass substrate is introduced into the apparatus such that the second major surface of the substrate may be coated. The substrate is heated to an elevated temperature. A pyrolytic transparent infrared reflective coating is then applied to the second major surface of the glass substrate. The coated glass substrate is cooled to ambient temperature. Preferably, the infrared reflective coating applied to the second major surface of the substrate includes a silica underlayer and a halogen-doped metal oxide overcoat.

BRIEF DESCRIPTION OF THE DRAWINGS

The above, as well as other advantages of the invention, will become readily apparent to those skilled in the art from the following detailed description of a preferred embodiment when considered in the light of the accompanying drawings in which.

DETAILED DESCRIPTION OF THE PREFERRED EMBODIMENT

It is to be understood that the specific devices and processes illustrated in the attached drawings, and described in the following description are, simply, exemplary embodiments of the inventive concepts defined in the appended claims. Hence, specific dimensions and other physical characteristics relating to the embodiments disclosed herein should not be considered as limiting, unless the claims expressly state otherwise.

Figure 1:
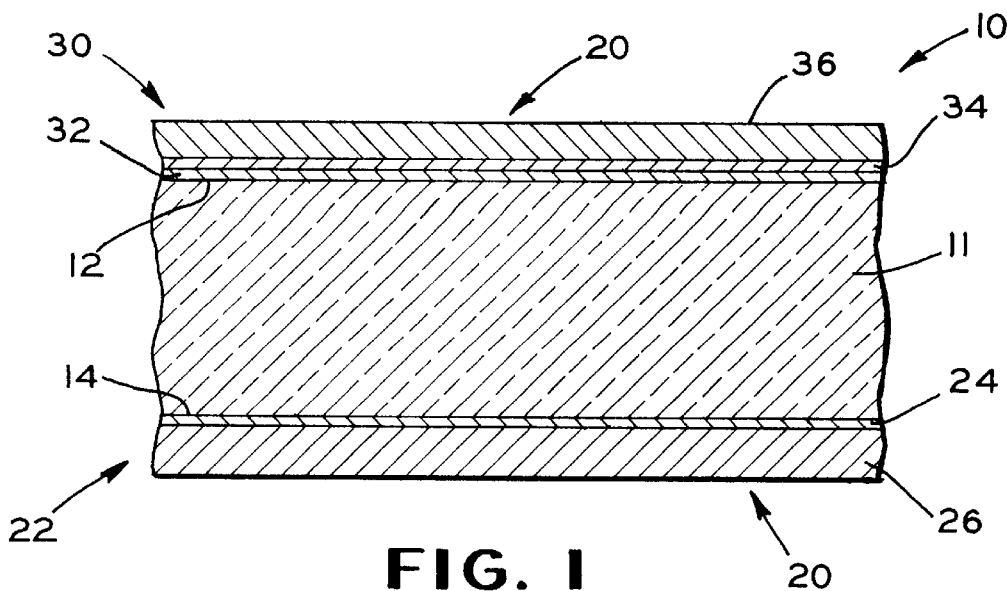
FIG. 1 is a side view of the coated glass article in accordance with the invention.

Referring now to FIG. 1, the invention is a coated glass article 10 which includes a glass substrate 11 having two major surfaces 12, 14. The two major surfaces 12, 14 are in an opposed mutually parallel relationship. Each major surface of the glass substrate 11 is coated with an infrared reflective coating 20. The infrared reflective coating 20 is comprised of an essentially transparent material. The infrared reflective coating 20 may also be referred to, herein, as a conductive coating. The infrared reflective coating 20 may also be referred to as a low E coating or a low emissivity coating.

Typically, an infrared reflective coating 20 is defined by a coated major surface of a glass substrate which exhibits an emissivity of less than 0.3. Preferably the emissivity will be less than 0.2, most preferably less than 0.15. In comparison, the emissivity of a standard sheet of uncoated glass is 0.84.

Typically, the coated glass article 10 has a visible light transmission of greater than 80% III A. The article 10 also preferably exhibits a haze of no more than 2%. Haze is caused by the scattering of light as the light passes through the glass article 10. With a haze of no more than 2%, the glass article 10 will have a neutral color in transmission. If the haze increases above 2%, the glass article 10 may have a milky, white color in transmission.

The coated glass article 10 normally demonstrates a resistance of 12 ohms per square. The resistance of the coated glass article 10 may be monitored as a cross check of the emissivity. Emissivity and conductivity are both dependent on free electrons. By determining the concentration and mobility of free electrons, the level of infrared reflection (emissivity) and the resistance (conductivity) may be calculated.

In accordance with the invention, the coated glass article 10 will have a reflected color in the blue-green to neutral range on the CIELAB color scale. Preferably, the color will range from green to neutral on the CIELAB color scale. Thus, with regard to the CIELAB color scale coordinates, a* will range from 0 to +12 or 0 to −12 and b* will range from 0 to +12 or 0 to −12. Preferably, a* will range from about 0 to about −10 and b* will range from about 0 to about −10. In the most preferred embodiment a* will range from about 0 to −8 and b* will range from about 0 to about −4. Measured on the CIELAB color scale coordinates, experimental samples have exhibited an a* of about −6.79 to about −7.61 and a b* of about −3.28 to about −2.96. The coated glass article 10 should exhibit a neutral color in reflectance. This may also be referred to as a substantially muted color in reflectance.

Suitable types of infrared reflective coatings include two or three layer stack configurations 22, 30. The two layer stack configuration 22 may include a silica layer 24 disposed on one major surface of the glass substrate 11 and a halogen-doped metal oxide layer 26 disposed on the silica layer 24. Preferably, the halogen-doped metal oxide is a fluorine-doped tin oxide. However, this invention is not limited to the use of a fluorine-doped tin oxide coating. Usually the thickness of the two layer configuration 22 on the surface of the glass substrate 11 will range from about 3000 Å to about 3500 Å. The silica layer 24 is preferably about 250 Å thick and the fluorine-doped tin oxide layer 26 is preferably about 3000 Å thick.

The silica layer 24 also acts as a sodium diffusion barrier. The silica layer 24 reduces the haze of the glass substrate 11 by preventing the alkaline earth constituents of the glass substrate 11 from migrating or diffusing and forming salts with the halogen associated with the tin oxide layer 26. The presence of salts in a film disposed on the surface of the glass substrate 11 causes the glass article 10 to appear hazy in transmission and reflectance. The presence of salts in a film also reduces the conductivity of the film. This is for at least the reason that salts are known to be nonconductive material. The halogen-doped tin oxide layer 26 functions as the infrared reflective coating.

In the case of a three layer stack configuration 30, the preferred configuration includes a tin oxide layer 32 disposed on one major surface 12 of the glass substrate 11, a silica layer 34 disposed on the tin oxide layer 32, and a fluorine-doped tin oxide layer 36 disposed on the silica layer 34. The three layer configuration 30 will normally range in thickness from about 2500 Å to about 5000 Å. Preferably, the tin oxide layer 32 is about 250 Å thick, the silica layer 34 is about 250 Å thick, and the fluorine-doped tin oxide layer 36 is about 2400 Å thick. The three layer stack configuration 30 may also be practiced by the use of metal oxides other than tin oxide. Alternatively, this invention may be practiced with the infrared reflective coating having only a layer of halogen-doped metal oxide, such as a fluorine-doped tin oxide (not shown).

The tin oxide layer 32 in combination with the silica layer 34 of the three layer stack configuration 30 function as a color suppression interlayer by suppressing the inherent reflective color of the glass substrate 11, preferably a soda-lime-silica glass substrate. For additional information regarding color suppression layers, U.S. Pat. Nos. 4,187,336, 4,206,252, and 4,419,386, issued to Gordon, are herein incorporated by reference as if fully rewritten. The silica layer 34 of the three layer configuration 30 also functions at least the same as the silica layer 24 of the two layer configuration 22. Also, the fluorine-doped tin oxide layer 36 functions the same as the fluorine-doped tin oxide layer 26 of the two layer configuration 22.

The coated glass article 10 may be tempered. Tempering is a process in which the glass article 10 is rapidly cooled from near the softening point under rigorous control to increase its mechanical and thermal endurance. However, neither tempering nor any other heat strengthening technique is required to practice this invention.

In one embodiment of the invention, the first major surface 12 of the glass substrate 11 is coated with the preferred three layer stack configuration 30. The second major surface 14 is coated with the preferred two layer stack configuration 22. The color of the first major surface 12 is neutral in transmission and reflectance. The color of the second major 14 surface is a very muted green color. The color of the second major surface 14 will appear neutral to the naked eye in at least reflectance, since the color of the first major surface 12 is the dominant color and the color contribution from the second major surface 14 is not sufficient to perceptually alter the color exhibited by the first major surface 14. It has been determined that the coating 30 on the first major surface 12 contributes approximately 12% of the color for the overall color of the glass article 10. In contrast, the coating 22 on the second major surface 14 contributes only 4% to the color of the glass article 10.

Figure 2:
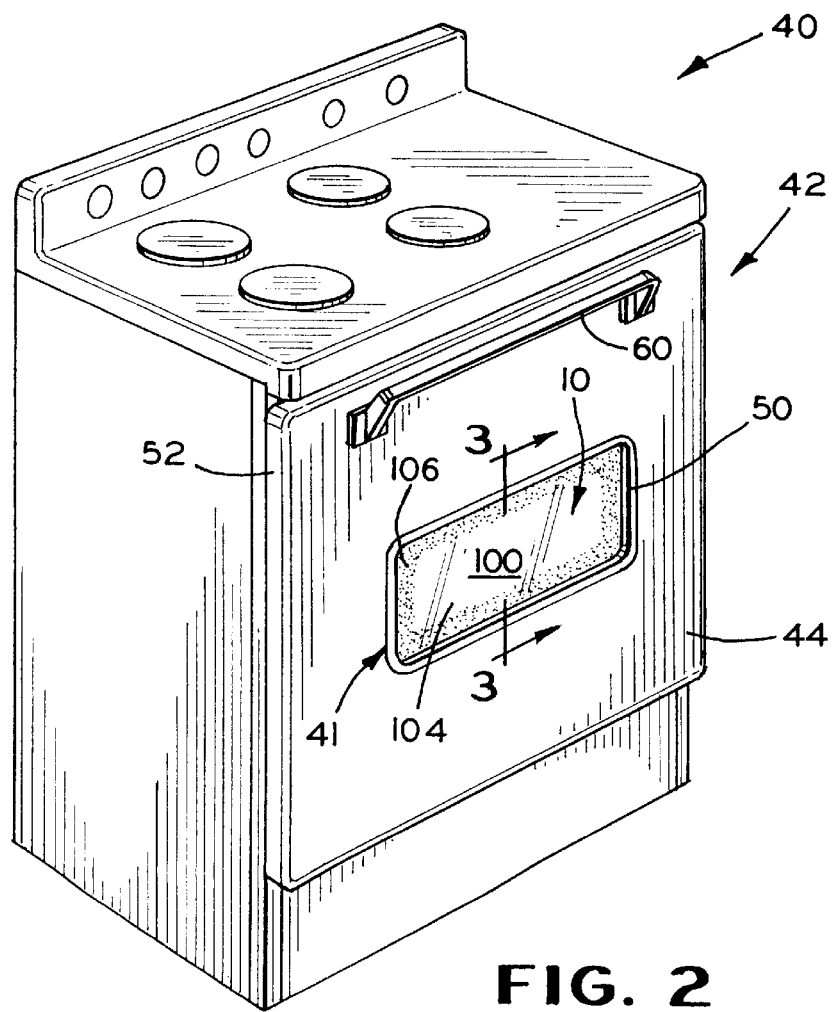
FIG. 2 is a plan view of a self cleaning oven which incorporates the invention.

As shown in FIG. 2, the coated glass article 10 may be a component of an oven 40, preferably a self cleaning oven. The glass article 10 is incorporated into the oven door 42 as part of the view window 41. Apart from the coated glass article 10, the oven door 42 is a standard oven door for a self cleaning oven. The oven door 42 includes front and back oven door panels 44, 52, each oven door panel having inner and outer surfaces (not shown). The inner surface of each oven door panel 44, 52 are in a mutually parallel, facing relationship with each other and define a chamber (not shown). Each of the oven door panels 44, 52 are produced from stamped sheet metal. Typically, the outer surface of the back oven door panel 52 has a porcelain enamel surface and faces an interior cavity of the oven (not shown). The chamber is filled with a sufficient amount of insulation in a predetermined area. The insulation is of a predetermined depth and size to assist in the cooling efficiency across the oven door 42. Optionally, an insulation retainer (not shown) may be used to maintain the insulation in the predetermined area. Each oven door panel 44, 52 also includes an aperture 50 (front oven door aperture) for receiving the view window. The aperture 50 of the front oven door panel 44 and the aperture of the back oven door panel 52 are vertically and horizontally aligned with each other. The oven door 42 may also include a handle 60. In an alternative embodiment, the front panel 44 of the over door 42 may be constructed from glass. In this embodiment the front panel 44 will not include the aperture 50.

Figure 3:
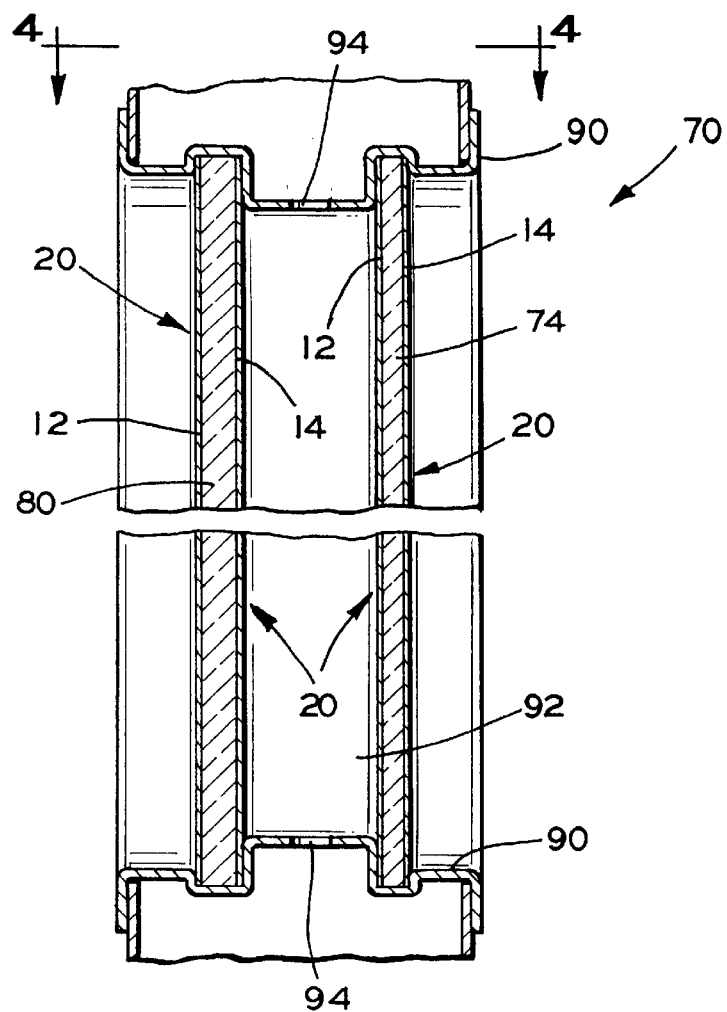
FIG. 3 is a cross sectional view taken along line 3—3 of FIG. 2 of the window assembly in accordance with the present invention.

As shown in FIG. 3, the oven door 42 also includes a window assembly 70. The window assembly 70 includes a first glass substrate 74 having first and second major surfaces 12, 14 (as described previously with regard to FIG. 1). The major surfaces 12, 14 of the first glass substrate 74 are in an opposed relationship to each other. The first glass substrate 74 is disposed closer to the back oven door panel (52 in FIG. 2) than the front oven door panel (44 in FIG. 2). The window assembly 70 also includes a second glass substrate 80 having first and second major surfaces 12, 14 (as described previously with regard to FIG. 1). The major surfaces 12, 14 of the second glass substrate 80 are in an opposed relationship to each other. In comparison to the first glass substrate 74, the second glass substrate 80 is disposed closer to the front oven door panel (44 in FIG. 2).

A frame 90 supports the first and second glass substrates 74, 80 of the window assembly 70 in a spaced apart and mutually parallel relationship. The preferred material of construction of the frame 90 is metal. However, the frame 90 may be constructed from other materials than metal. The frame is positioned such that the window assembly 70 is aligned with the aperture in each of the oven door panels (44, 52 in FIG. 2). As a result, a person standing outside the oven 40 may view the interior cavity of the oven 40 through each aperture and the window assembly 70. The first and second glass substrates 74, 80 are normally separated by a distance of one inch, however, this separation distance is not critical to the practice of the invention. The frame 90 is generally attached to the inner surface of each of the oven door panels (44, 52 in FIG. 2). Optionally, the first and second glass substrates 74, 80 may also be separated by a spacer (not shown).

The previously described infrared reflective coating 20 is disposed on at least one and preferably both major surfaces 12, 14 of the first and second glass substrates 74, 80. The aforementioned description of the coated glass substrate accurately describes the coated first and second glass substrates 74, 80 of the window assembly 70. Preferably, the first and second glass substrates 74, 80 are disposed such that the first major surface 12 having the three layer stack configuration 30 is facing the front oven door panel 44.

The oven door 42 also preferably includes a third glass substrate 100 (FIG. 2) having an internal major surface and an external major surface 104. This third glass substrate 100 may also be referred to as the exterior window or pane. The internal surface (not shown) of the third glass substrate 100 faces the second glass substrate 80 (FIG. 3). The internal surface of the third glass substrate 100 is coated with an infrared reflective coating 20.

The external major surface 104 of the third glass substrate 100 faces the same direction as the outer surface of the front oven door panel 44. The external major surface 104 is preferably not coated with an infrared reflective coating 20. The external major surface 104 of the third glass substrate 100 may, optionally, be coated with a decorative enamel 106. The external major surface 104 of the third glass substrate 100 is destined to face externally from the oven 40. The third glass substrate 100 is attached to the inner surface of the front oven door panel 44 in horizontal and vertical alignment with the aperture 50 in the front oven door panel 44. The third glass substrate 100 is secured in a spaced apart and mutually parallel relationship to the first and second glass substrates 74, 80.

Figure 4:
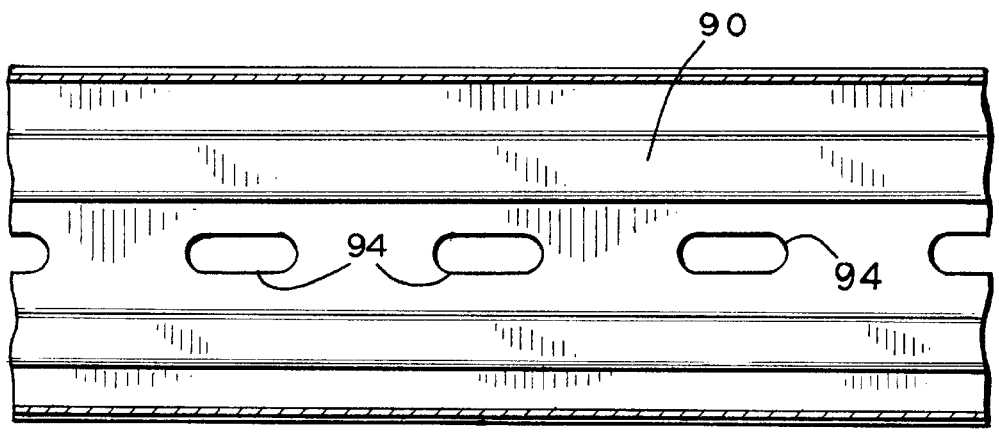
FIG. 4 is a top view taken along line 4—4 of FIG. 2 of the plurality of apertures in accordance with the present invention.

In FIG. 3, a chamber 92 is defined between the first and second glass substrates 74, 80 and the frame 90. Optionally, the frame 90 may include a plurality of apertures 94, as shown in FIG. 3 and FIG. 4. Each one of the plurality of apertures 94 communicate with the chamber 92 defined between the first and second glass substrates 74, 80 and the frame 90, such that air may travel through the chamber 92. Preferably, the plurality of apertures 94 are aligned vertically to allow the air to travel vertically through the chamber 92.

As is the case with the glass article 10 previously described, the window assembly 70 should not exhibit substantial color in at least reflectance, that is, it should exhibit a neutral color. The window assembly 70 should thus appear colorless to the naked eye. During the self cleaning process, a significant temperature drop will occur across the view window 41. The temperature inside the oven 40 during self cleaning will reach as high as 482° C. (900° F.). The temperature of the exterior surface 104 of the third glass substrate 100 should be no more than 60° C. (140° F.). Preferably, the temperature of the exterior surface 104 of the third glass substrate 100 should be less than 58° C. (136° F.). Typically, the temperature of the exterior surface 104 of the third glass substrate 100, of the oven 40 with the view window 41 in accordance with the invention, will be less than 48° C. (119° F.).

The method of manufacturing the glass article 10, in accordance with the invention, includes providing at least a glass substrate 11 with first and second major surfaces 12, 14. Preferably a plurality of the glass substrates will be provided at a time. The first major surface 12 is coated with the transparent infrared reflective coating 20. The second major surface 14 is preferably uncoated. A suitable example of this type of glass substrate 11 is the "Energy Advantage™" Low -E glass commercially available from Pilkington Libbey-Owens-Ford Co. Usually, the first major surface 12 of the glass substrate 11 is coated with the preferred three layer stack configuration 30 previously discussed.

A coating apparatus located in a tempering oven which includes multiple coaters and a plurality of heating zones is also provided. Preferably the coaters are in the same or adjacent zones of the tempering oven. The coaters are able to apply coatings of various thicknesses depending on the flow rate of the precursor materials, the temperature, and the line speed. Generally, heat is provided by radiant heaters within the oven.

The glass substrate 11 is cut to a predetermined finished dimension. Edgework is also prepared on the glass substrate 11. The edgework is typically prepared by removing the sharp clean cut edges from the glass substrate 11. The edges of the glass substrate 11 may be transformed into pencil edges, rounded edges, or other types of aesthetically pleasing designs. This also improves the easy of handling of the glass substrate 11, as it helps relieve inherent stresses in the glass substrate 11.

The glass substrate 11 is heated to an elevated temperature. The glass substrate 11 is heated to a temperature above the strain point for the glass substrate 11 and below the glass softening point of the substrate 11, a typical temperature range being from about 538 (1000) to about 593° C. (1100° F.).

The glass substrate 11 is then pyrolytically coated with a transparent infrared reflective coating 20. The infrared reflective coating 20 is preferably, formed from a gaseous precursor mixture. The gaseous precursor mixture is directed toward and along the second major surface 14 of the glass substrate 11. The gaseous precursor mixture contains at least a metal compound, preferably tin. The mixture also contains a halogen containing component, oxygen, water, and an inert carrier gas. This mixture is reacted at or near the second major surface 14 of the glass substrate 11. The halogen-doped metal oxide coating 26 is deposited on second major surface 14 of the glass substrate 11. Alternatively the halogen-doped metal oxide 26 coating is deposited on the silica layer 24 disposed on the second major surface 14 of the glass substrate 11.

One example of a suitable metal containing material is dimethyl tin dichloride, however the present invention is not limited to the use of this compound. Suitable halogen containing materials may be hydrofluoric acid, trifluoracetic acid or any compound which the halogen may easily be removed to dope the metal oxide layer.

If desired, the coated glass article 10 is heated for tempering. Preferably, the coated glass article 10 is at a temperature of between about 538 (1000) and about 593° C. (1100° F.) for tempering. During coating, the temperature of the glass article 10 may drop below 538° C. (1000° F.). If this is the case, the coated glass article 10 is subjected to a boost heating process. This is preferably accomplished by forced convection heating. During boost heating, the temperature of the glass article 10 is elevated to a temperature in the range of about 538 (1000) to about 593° C. (1100° F.).

Once the temperature of the glass article 10 is within the desired range, the article 10 is quenched. The quenching process reduces the temperature of the glass article 10 to below the strain point. Usually, this is a temperature of less than 316° C. (600° F.), and preferably less than 288° C. (550° F.). Tempering is not required to practice the invention.

The glass article 10 is cooled to ambient temperature. The glass article 10 may be cooled by a forced air system blasting air across at least one major surface of the glass article 10.

In the case of the infrared reflective coating 20 including a two layer configuration 22, a gaseous precursor mixture including a silica containing component is directed toward and along the second major surface 14 of each glass substrate 11. Besides the gaseous precursor including at least one silica containing component, preferably (as described in U.S. Pat. No. 5,798,142 incorporated herein by reference as if fully rewritten), the mixture may contain a radical scavenger, oxygen, and an inert carrier gas. The radical scavenger is present in sufficient amount such that the reaction occurs at or near the second major surface 14, ignition of the precursor gases is prevented, and the rate of reaction is regulated. This reaction forms the silica layer 24 on the second major surface 14 of the glass substrate 11. A suitable example of the silica containing component is monosilane. A suitable example of a radical scavenger is ethylene. Examples of standard inert carrier gases are nitrogen and helium.

In the case of the plurality of the glass substrates to be coated, the plurality is introduced in a predetermined pattern in the length and width direction of the apparatus such that the second major surface of each glass substrate may be coated. The substrates should be arranged such that the coaters will coat each glass substrate under the condition of laminar flow. As is well known in the art of CVD coating, laminar flow results in a more uniform coating in which the thickness of the coating is more easily controllable than under the conditions of turbulent flow. It has been discovered that laminar flow may be achieved by arranging the plurality of glass substrates within one inch of each other in the width and length direction of the oven.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A coated glass article, comprising:
    a glass substrate having first and second major surfaces in an opposed relationship to each other; and
    a transparent infrared reflective coating disposed on each major surface of said glass substrate.

2. A coated glass article as defined in claim 1, wherein at least one of said major surfaces of said coated glass substrate has an emissivity of no more than 0.3.

3. A coated glass article as defined in claim 1, wherein said infrared reflective coating disposed on at least one major surface of said glass substrate is comprised of a two layer coating.

4. A coated glass article as defined in claim 3, wherein said two layer coating configuration is a silica layer deposited on said glass substrate, and a fluorine-doped tin oxide layer deposited on said silica layer.

5. A coated glass article as defined in claim 1, wherein said infrared reflective coating disposed on at least one major surface of said glass substrate includes a halogen-doped metal oxide.

6. A coated glass article as defined in claim 1, wherein said infrared reflective coating disposed on at least one major surface of said glass substrate has a thickness of from about 2500 Å to about 5000 Å.

7. A coated glass article as defined in claim 1, wherein said coated glass article exhibits a neutral color in reflectance on the CIELAB scale.

8. A coated glass article as defined in claim 1, wherein one major surface of the glass substrate has a muted green color in reflectance, however, said article exhibits a neutral color in at least reflectance.

9. A window assembly for an oven door comprising:
    a first glass substrate having first and second major surfaces in an opposed relationship;
    a second glass substrate having first and second major surfaces in an opposed relationship;
    a frame which supports said first and second glass substrates in a spaced apart and mutually parallel relationship; and an infrared reflective coating disposed on both major surfaces of said first and second glass substrates.

10. A window assembly for an oven door as defined in claim 9, further including a chamber defined by said first and second glass substrates and said frame and a plurality of apertures disposed on said frame in communication with said chamber.

11. A window assembly for an oven door as defined in claim 9, wherein said infrared coating disposed on at least one major surface of said first and second glass substrates comprises a silica layer deposited on said at least one major surface of said first and second glass substrates and a fluorine-doped tin oxide layer deposited on said silica layer.

12. A window assembly for an oven door as defined in claim 9, wherein at least one major surface of said first and second glass substrates has an emissivity of no more than 0.3.

13. A window assembly for an oven door as defined in claim 9, wherein said infrared coating disposed on at least one major surface of said first and second glass substrates has a thickness of about 2500 Å to about 5000 Å.

14. A window assembly for an oven door as defined in claim 9, wherein said first and second glass substrates exhibit a neutral color in reflectance on the CIELAB scale.

15. A window assembly for an oven door as defined in claim 14, wherein at least one of said glass substrates has a visible light transmission of at least 80% Ill. A.

16. A method of making a double sided coated heat barrier glass article, comprising:
   a) providing a glass substrate with first and second major surfaces, the first major surface being coated with a transparent infrared reflective coating;
   b) heating the substrate to an elevated temperature;
   c) applying a pyrolytic infrared reflective coating to the second major surface of the glass substrate; and
   d) cooling the coated glass substrate to ambient temperature.

17. A method of making a glass article as defined in claim 16, further comprising tempering the glass substrate.

18. A method of making a glass article as defined in claim 17, wherein said tempering of the glass substrate includes optionally heating the glass substrate such that the temperature of the glass substrate is at least 1000° F. and then quenching the glass substrate to lower the temperature of the glass substrate to less than 600° F.

19. A method of making a glass article as defined in claim 16, further comprising before b) cutting the glass substrate to a predetermined finished dimension and preparing the edgework of the glass substrate.

20. A method of making a glass article as defined in claim 16 wherein air is forced against the glass substrate to cool it.

* * * * *